United States Patent [19]

Friedrich

[11] 4,092,824
[45] June 6, 1978

[54] METHOD OF OPERATING A TURBINE

[75] Inventor: Helmut Friedrich, Stuhr, Germany

[73] Assignee: Vereinigte Flugtechnische Werke-Fokker GmbH, Bremen, Germany

[21] Appl. No.: 473,500

[22] Filed: May 28, 1974

[51] Int. Cl.² .......................... F02C 7/00; F02C 7/32
[52] U.S. Cl. ................. 60/39.02; 60/39.14; 60/39.46 M
[58] Field of Search ............ 60/39.46 M, 39.02, 39.05, 60/39.06, 39.33, 39.15, 649, 673, 39.14

[56] References Cited

U.S. PATENT DOCUMENTS

| 2,648,317 | 8/1953 | Mikulasek | 60/39.46 M |
|---|---|---|---|
| 2,775,866 | 1/1957 | Randall | 60/39.46 M |
| 2,930,184 | 3/1960 | Plescia et al. | 60/39.46 M |
| 2,959,919 | 11/1960 | Chiera et al. | 60/39.14 |
| 2,972,911 | 2/1961 | Volk et al. | 60/39.14 |
| 3,087,304 | 4/1963 | Walter | 60/39.46 M |
| 3,451,215 | 6/1969 | Barr | 60/39.14 |
| 3,525,217 | 8/1970 | DeMattia | 60/39.46 M |
| 3,660,977 | 5/1972 | Reynolds | 60/39.46 M |

FOREIGN PATENT DOCUMENTS

| 836,835 | 6/1960 | United Kingdom | 60/39.14 |
|---|---|---|---|
| 1,229,203 | 4/1971 | United Kingdom | 60/39.14 |

*Primary Examiner*—Carlton R. Croyle
*Assistant Examiner*—L. T. Casaregola
*Attorney, Agent, or Firm*—Ralf H. Siegemund

[57] ABSTRACT

A gas turbine for starting an aircraft engine and for driving auxiliary equipment, being normally run by combustion, receives decomposition gases of hydrazine, selectively on a standby basis, whereby aircraft engine fuel is added to these gases, and the mixture is then fed to the turbine to drive the turbine without combustion.

8 Claims, 1 Drawing Figure

U. S. Patent
June 6, 1978
4,092,824
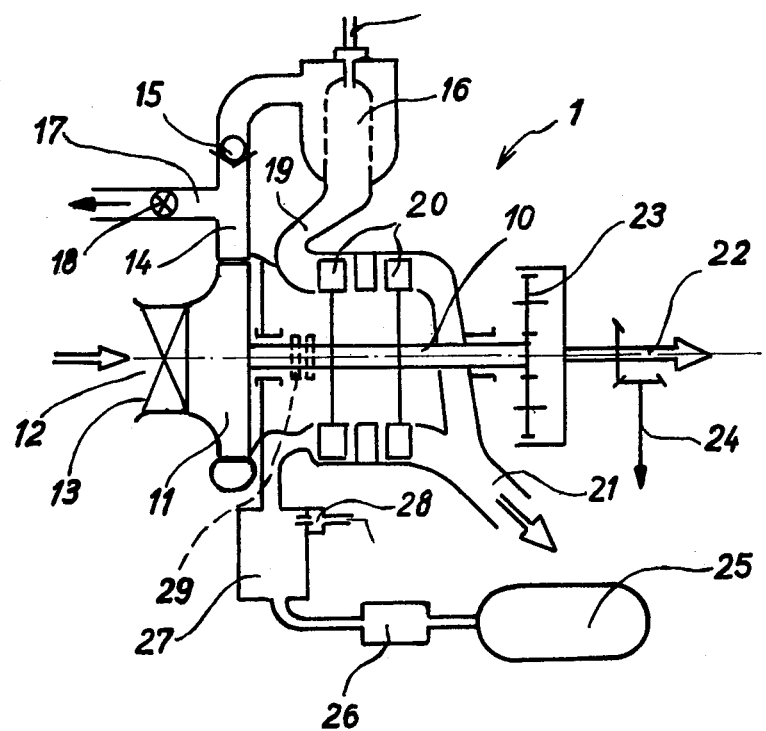

METHOD OF OPERATING A TURBINE

BACKGROUND OF THE INVENTION

The present invention relates to operation of an auxiliary gas turbine as used for starting an aircraft engine and for driving other, on-board auxiliary equipment, such as an electric generator, hydraulic pumps, fuel pumps, etc. More particularly the invention relates to equipment for operating such a gas turbine under conditions which do not permit sustaining regular combustion for reasons of lack of adequate air supply.

Present day aircraft are usually equipped with a gas turbine for starting the engines without requiring assistance from ground equipment. However, the turbine is used also for driving auxiliary, secondary power generating and supply equipment, such as hydraulic pumps, generators etc. when the aircraft engines are off. Moreover, it was found advisable to have two power supply channels on board, one being driven by one of the engines and the second one by the gas turbine. This is particularly of advantage in the case of engine failure as the alternative power supply channel, driven by the gas turbine, remains functioning. In the case of a VTOL aircraft, the one channel is driven by a forward thrust producing engine; if it fails, the aircraft can still operate with the lift producing engines while the gas turbine drives the second power supply channel.

The operation of a gas turbine is not always without problems. When run by regular combustion, an adequate amount of air is needed to sustain combustion. Since low air pressure at high altitudes precludes such supply, it has been suggested to tap the compressor of an engine and to draw air therefrom as that compressor is sufficiently powerful. This is an adequate solution to the problem but fails when the particular engine drops out. Therefore, it has been suggested to drive the gas turbine with gas developed e.g. by decomposing hydrazine.

The gas generated in a hydrazine decomposing reaction chamber will be fed directly to a turbine stage of the auxiliary gas turbine. The problem exists here that the thermodynamic conditions of operating the gas turbine with combustion gases or with hydrazine decomposition gases differ substantially.

DESCRIPTION OF THE INVENTION

It is an object of the present invention to improve the operation of a gas turbine in an aircraft when operated by gas developed by a one component fuel without combustion.

It is another object of the present invention to improve on the operation of turbines, which run with the decomposition gases of hydrazine.

In accordance with the preferred embodiment, it is suggested to inject aircraft engine fuel into the flow of gas or gasses as developed by decomposition of a monocomponent fuel and as flowing to the turbine for decompression therein. As a consequence, the temperature of these gases as well as their flow speed to the turbine is reduced while the mass throughput is increased.

In the preferred form of practicing the invention, it is suggested to develop these gases by catalytic reaction of hydrazine. That reaction is exothermic, so that injected fuel evaporates, and the evaporation lowers the temperature of the mixture. Under these circumstances, the performance of the gas turbine when operating with this mixture of fuel and hydrazine decomposition products, matches more closely the performance of the turbine when the driving gas is developed by combustion. However, irrespective of that aspect, the operation of a turbine, when running on the decomposition products of hydrazine, is considerably improved.

DESCRIPTION OF THE DRAWING

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically an example of the preferred embodiment of the invention.

In particular, the FIGURE shows an auxiliary gas turbine 1 having a shaft 10 which carries a compressor 11. An airscoop and entrance 12 for air to be compressed is provided along the axis of the system but a throttle 13, such as a blocking valve or a throttling vane, may close entrance 12. The air as compressed by compressor 11 is fed to a channel or duct 14, which can be closed by a valve 15. The duct 14 leads to a combustion chamber 16 which receives also fuel in the usual manner to obtain combustion, and the resulting pressurized gas drives the turbine.

A branching duct 17, closable by a valve 18, can tap the compressor 11, so that compressed air is used additionally, for example, for an air-conditioning system.

The gases developed in combustion chamber 16 are fed to the turbine 1 via a duct 19 to drive the blades 20 of the turbine. The turbine, in effect, decompresses the combustion gases and is driven thereby to drive the shaft 10. An exhaust pipe 21 discharges the compressed gases.

Shaft 10 drives a transmission gear 23 having an output shaft 22, possibly geared to another shaft 24 for connection to the equipment driven by the gas turbine, such as fuel pump, lubrication oil pump, electric generator, etc. All this equipment is vital for continued operation of the aircraft.

The system works adequately as long as the compressor 11 receives sufficient quantities of air. However, for high altitudes this may not be the case, and combustion in chamber 16 may not be sustained. In order to ensure continued operation of the gas turbine, a mono-component fuel, such as hydrazine, is taken from a tank 25.

This particular fuel is passed to a gas generator 27 via a controlled valve 26 which enables control of turbine output speed. The gas generator 27 decomposes the hydrzine by catalytic reaction in generator chamber 27 for producing pressurized, decomposition gases. The reaction chamber, therefore, contains a catalyst to obtain the production of gas. Generally speaking, the fuel or propellant used here is to be of the type which decomposes, for example, by catalytic reaction and not by combustion; such a fuel can be termed monocomponent fuel in analogy of a mono-propellant. Hydrazine decomposes in the presence of platinum and is a monopropellant to be used here as a mono-component fuel for a turbine to be operated in the absence of air. The chamber 27 may include platinum in finely divided form which decomposes the hydrazine on contact. The hydrazine used preferably here is of the type of 70% hydrazine ($N_2H_4$) plus 30% water ($H_2O$)

Since hydrazine decomposes also thermally, the generator 27 may simply be a duct which is sufficiently hot to obtain thermo-decompositioning.

In addition, aircraft engine fuel, i.e. Kerosene, is injected into chamber 27 via a nozzle 28. The gases as developed in chamber 27 and as mixed with injected fuel are fed to the turbine blades 20 for driving them.

The decomposition process for hydrazine is an exothermic one, so that the decomposition gases as generated in chamber 27 are quite hot (about 620° C or 1150° F). Thus, the injected fuel evaporates immediately which in turn increases the mass throughput of the gases, and that in turn increases the mass throughput of gases while reducing the velocity of the gases into the turbine and towards blades 20.

Generally, the amount of fuel injected should be limited to make sure that all of the injected fuel evaporates. However, this presents no problem, and one will not reach that limit, because hydrazine develops thermal energy in the range from 370 to 830 kilocalories per kilogram, depending upon the degree of decompositioning.

It can be seen that merely by adding engine fuel to the decomposition gases, before feeding these gases to the turbine, operation thereof is considerably improved. The added fuel does not undergo combustion. The ratio of hydrazine blend (70% hydrazine, 30% water), (as decomposed) to fuel, each on a per unit time, i.e. rate basis, should be about 8.5:1.5 to 8:2. The compressor 11 should not run at all when the turbine is driven by the reaction gases from chamber 27. Accordingly, a clutch 29 permits disconnection of turbine shaft 10 from the compressor. An alternative arrangement can be established by constructing the turbine as a two stage machine of which the first stage is drivingly connected to the compressor. In the emergency case, the two stages are disconnected from each other, and the reaction chamber 27 connects only to the second stage.

The example above refers to the double mode of operation in that the turbine is used normally under conditions of regular combustion. The example, however, can be understood in a broader sense in that the invention improves generally operation of a hydrazine-operated turbine irrespective of whether or not that turbine operates at times with fuel combustion. Thus, it is within the scope of the invention to have a system of a regular gas turbine, and a hydrazine-operated gas turbine may sit on the same shaft. This turbine is then operated only in the case the gas turbine does not operate and fuel is added to decomposition gases from the hydrazine reaction.

The invention is not limited to the embodiments described above but all changes and modifications thereof not constituting departures from the spirit and scope of the invention are intended to be included.

I claim:

1. Method of operating an auxiliary gas turbine which is used for starting an aircraft engine and for driving auxiliary on-board equipment comprising the steps of, generating externally to the turbine a pressurized gas without sustaining combustion, for driving the turbine;
   mixing the pressurized gas after its generation with aircraft engine fuel; and
   feeding the mixture to the turbine for driving the turbine, so that the turbine is driven by the mixture without undergoing or having undergone combustion.

2. Method as in claim 1, wherein the mixing is carried out by fuel injection, not in excess of the amount of fuel which can evaporate upon injection.

3. Method as in claim 1, wherein the external generation of gas is comprised of the decompositioning of hydrazine.

4. In a method of operating a gas turbine on board of an aircraft, the turbine having a turbine chamber and a combustion chamber which normally produces propellant gas by combustion, so that the turbine is normally operated by combustion of fuel in the combustion chamber, comprising the steps of decomposing a mono-component fuel without combustion when combustion does not provide for the development of driving gases for any reason, so as to provide a substitute driving gas for the turbine resulting from the decomposing;
   mixing the substitute driving gas after its generation with aircraft engine fuel; and
   feeding the mixture to the turbine chamber, by-passing the combustion chamber, for driving the turbine by the mixture without combustion thereof.

5. In a method as in claim 4, using hydrazine as the mono-component fuel, the engine fuel as mixed therewith evaporating completely before the mixture enters the turbine.

6. In a method as in claim 4, wherein the mixing is carried out by fuel injection, not in excess of the amount of fuel which can evaporate upon injection.

7. In a method as in claim 4, wherein the external generation of gas is comprised of the decompositioning of hydrazine.

8. In a method as in claim 4, using a hydrazine-water mixture as monofuel.

* * * * *